Dec. 29, 1925.
L. L. WHITNEY
1,567,351
METHOD OF FORMING PULL ROD JAWS
Filed July 5, 1924     2 Sheets-Sheet 1
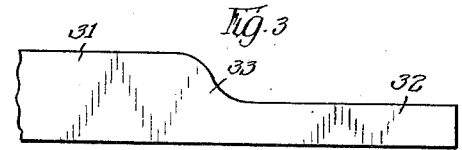
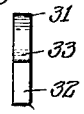
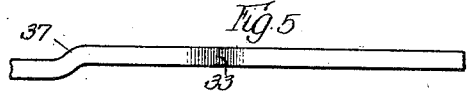
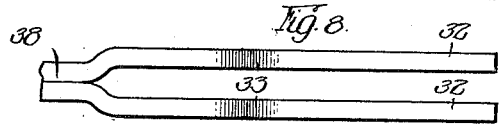
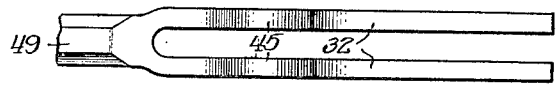
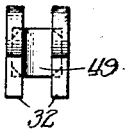
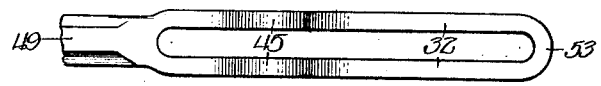
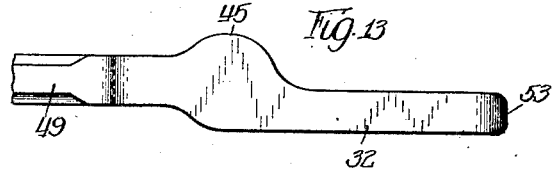
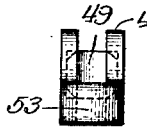

Dec. 29, 1925.
L. L. WHITNEY
1,567,351
METHOD OF FORMING PULL ROD JAWS
Filed July 5, 1924   2 Sheets-Sheet 2
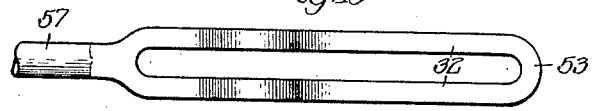
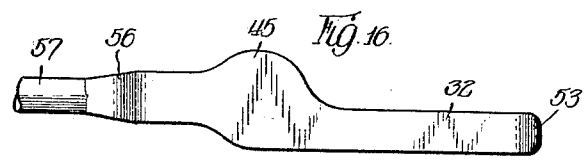
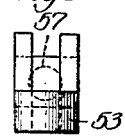
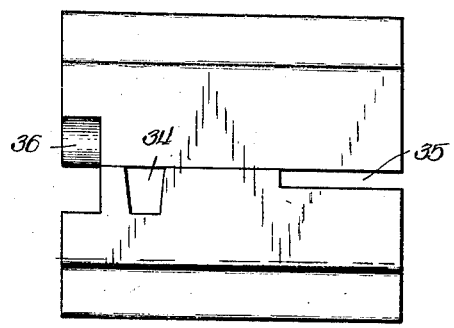
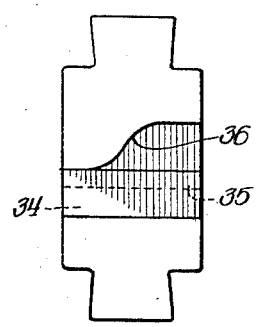
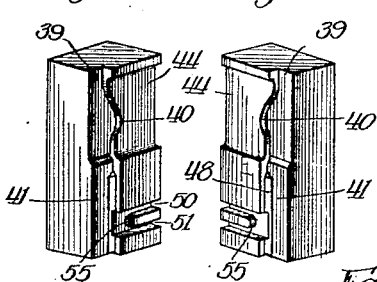
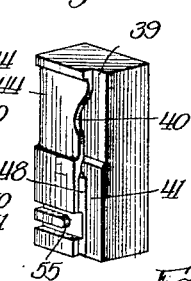
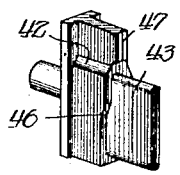
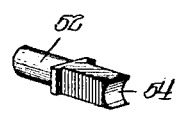
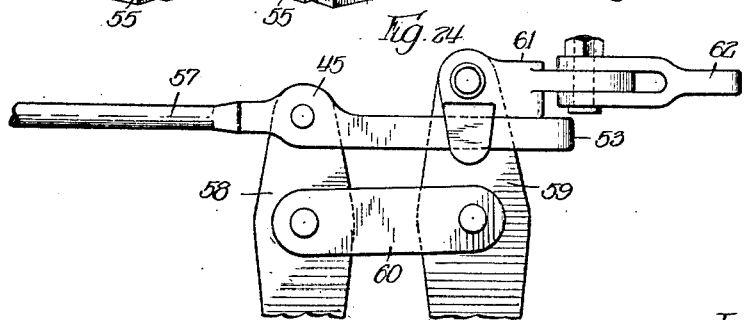
Inventor:
Loren L. Whitney, Patented Dec. 29, 1925.

1,567,351

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

METHOD OF FORMING PULL-ROD JAWS.

Application filed July 5, 1924. Serial No. 724,241.

*To all whom it may concern:*

Be it known that I, LOREN L. WHITNEY, a citizen of the United States, residing at Hammond, in the county of Lake and State of Indiana, have invented certain new and useful Improvements in Methods of Forming Pull-Rod Jaws, of which the following is a specification.

This invention relates to a new and improved method of forming jaws and more particularly jaws of the type adapted for brake pull rods.

Jaws of this type are formed of steel and are integrally connected, usually by welding, to the end of a rod. The jaw comprises a solid connecting portion and spaced jaws which receive between them the other portions of the brake mechanism such as levers.

I have shown in the accompanying drawings a closed jaw; that is, one in which the ends of the jaws away from the rod end are joined together. However, the method herein described can be used for the formation of open jaws by the omission of the last step which consists in closing the ends of the jaws.

It is an object of the present invention to provide a new and improved method for forming jaws of this type, which can be carried out by a series of hammering and forging operations.

It is a further object to provide a method of this character by means of which blanks in strip form may be quickly shaped to the desired configuration without loss of metal.

It is an additional object to provide method of this character which may be simply and rapidly carried out and which is adapted for commercial production.

Other and further objects will appear as the description proceeds.

I have shown in the accompanying drawings the blanks used and their appearance as the various steps in the process progress and have also shown hammer dies and forging dies of types adapted to be used and have shown one form of the jaws applied to a typical brake assembly.

In the drawings:—

Figure 1 is a face view of the blank used;

Figure 2 is an end view of Figure 1;

Figure 3 is a view similar to Figure 1, but showing the blank after the first hammering operation;

Figure 4 is a view of Figure 3 as seen from the end;

Figure 5 is a plan view of the blank after the offsetting operation;

Figure 6 is a face view of Figure 5;

Figure 7 is an end view of Figure 5;

Figure 8 is a plan view of two of the blanks of Figures 5 to 7 as placed together;

Figure 9 is a view of the blanks of Figure 8 after a forging operation;

Figure 10 is a face view of Figure 9;

Figure 11 is an end view of Figure 9;

Figure 12 is a view similar to Figure 9 showing the jaw after the ends are closed;

Figure 13 is a face view of Figure 12;

Figure 14 is an end view of Figure 13;

Figure 15 is a view showing the jaw welded to a brake rod;

Figure 16 is a face view of Figure 15;

Figure 17 is an end view of Figure 16;

Figure 18 is a face view of suitable hammer dies;

Figure 19 is a view of Figure 18 as seen from the left;

Figures 20 and 21 show suitable forging dies;

Figure 22 shows the forging plunger used in the first pass;

Figure 23 shows the forging plunger used in the second pass; and

Figure 24 is a fragmentary view showing the jaw applied to a brake assembly.

In the making of jaws according to the present method, a pair of blanks of the form shown in Figures 1 and 2 are first taken and one end of each blank is heated. The heated ends are then reduced in depth by means of hammer dies shown in Figures 18 and 19 and are drawn out in length as they are reduced in depth. The blank 31 is thus given the reduced end 32 and the rounded intermediate portion 33. Referring to Figures 18 and 19 the reduced end is formed as to depth in the recess 34, is maintained in thickness in hammer die recess 35 and the curve 33 is formed by the hammer die portion 36. The blank 31 is next offset as clearly shown at 37 in Figure 5.

A pair of blanks are now heated and placed together in the manner shown in Figure 8, the reduced portions 32 of the two blanks being spaced apart and the ends at full depth 38 being placed against each other. The two heated blanks are now placed together in a vertical position against one of the dies as shown in Figures 20 and 21, the reduced ends 32 of the blanks extending upwardly through the ends 39 of the die recesses. Curved portion 33 fits adjacent the curve portion 40 of the recess. The ends 38 of the blanks extends down adjacent the portions 41 of the die recesses.

The two dies shown in Figures 20 and 21 are now brought together, the usual method, of course, being to have one die fixed and the other movable. Simultaneously the plunger 42, shown in Figure 22, is introduced at right angles into the space between the dies, the reduced portion 43 of the plunger passing between the portions 32 of the blanks and between the recesses 44 in the dies. As this movement continues inwardly the metal adjacent the curved portion 33 is formed into the pivot portion 45, as shown in Figure 10, by means of the curved portion 40 of the dies and the curved portion 46 of the plunger 42. The portion 47 of the plunger comes opposite the lower portion 48 of the dies and these together form the two portions 38 of the blanks into shank 49, as shown in Figure 10.

If it is desired to continue the process and close the ends of the jaws, the ends of portions 32 are heated and they are thrust horizontally between the dies shown in Figures 20 and 21, being placed in the slots 50 and 51. The two dies are brought together and the plunger 52 shown in Figure 23 is forced inwardly against the ends of the portions 32. The ends of these portions are thus turned inwardly and forced against each other and welded together to form the closed end 53. This end 53 is formed between the arcuate portion 54 of the plunger 52 and the curved ends of the die portions 55. In the next step in the process, the shank 49 is rounded as shown at 56 in Figure 15 and welded to the end of a rod 57.

In Figure 24 one application of the closed jaw is shown. Here the jaw is secured to the end of a pull rod 57 the pivot portion 45 being pivoted to a brake lever 58 and the adjacent brake lever 59 extending upwardly through the closed jaw. The brake levers 58 and 59 are connected by link 60. The upper end of the brake lever 59 is prevented from dropping through the closed slot by means of the hanger 61 which is pivotally connected to the upper end of the brake lever. By means of this hanger the brake lever 59 is connected to rod 62. This particular brake construction need not be fully described as it forms no part of the present invention, it has been shown merely to illustrate one application of the type of jaws shown herein.

I claim:

1. The method of forming jaws or the like which comprises reducing the depth of one end of each of a pair of strips of metal offsetting the strips at the opposite end, heating the offset ends, placing the offset ends together, the reduced portions being spaced apart, welding the offset ends together and reducing same to form a relatively large intermediate pivot portion.

2. The method of forming jaws or the like which comprises reducing the depth of one end of each of a pair of strips of metal offsetting the strips at the opposite end, heating the offset ends, placing the offset ends together, the reduced portions being spaced apart, welding the offset ends together and reducing same to form a relatively large intermediate pivot portion and heating the spaced reduced ends and turning them inwardly toward each other and welding them together.

3. The method of forming jaws or the like which comprises reducing the depth of one end of each of a pair of strips of metal offsetting the strip at the opposite end, heating the offset ends, placing the offset ends together, the reduced portions being spaced apart, welding the offset ends together and reducing same to form a relatively large intermediate pivot portion and heating the spaced reduced ends and turning them inwardly toward each other and welding them together and providing the intermediate pivot portion with a pivot opening.

Signed at Hammond, Indiana, this 27th day of June, 1924.

LOREN L. WHITNEY.